US012616217B2

(12) United States Patent
Banat et al.

(10) Patent No.: US 12,616,217 B2
(45) Date of Patent: May 5, 2026

(54) FOOD PACKAGING FILMS FOR FOOD STORAGE AND FRESHNESS MONITORING

(71) Applicant: Khalifa University of Science and Technology, Abu Dhabi (AE)

(72) Inventors: Fawzi Banat, Abu Dhabi (AE); Vengatesan Muthukumaraswamy Rangaraj, Abu Dhabi (AE); Mohammad Abu Haija, Abu Dhabi (AE); Fathima Sumaiya Mohamed Rafeek, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 243 days.

(21) Appl. No.: 18/205,824

(22) Filed: Jun. 5, 2023

(65) Prior Publication Data

US 2024/0397981 A1 Dec. 5, 2024

(51) Int. Cl.

| | |
|---|---|
| ***A23L 3/3472*** | (2006.01) |
| ***A23B 2/733*** | (2025.01) |
| ***A23B 2/762*** | (2025.01) |
| ***A23B 2/779*** | (2025.01) |
| ***B65D 81/28*** | (2006.01) |

(52) U.S. Cl.
CPC .............. *A23B 2/733* (2025.01); *A23B 2/762* (2025.01); *A23B 2/779* (2025.01); *B65D 81/28* (2013.01)

(58) Field of Classification Search
CPC ............. G01N 33/0054; G01N 21/783; G01N 31/229; B32B 27/08; A23B 2/733; A23B 2/762; A23B 2/779; B65D 81/28
USPC .......................................................... 426/321
See application file for complete search history.

(56) References Cited

FOREIGN PATENT DOCUMENTS

| | | | | |
|---|---|---|---|---|
| CN | 114047184 A | * | 2/2022 | ............. G01N 21/80 |
| CN | 116023716 A | * | 4/2023 | |

OTHER PUBLICATIONS

Translation of CN-114047184-A (Year: 2022).*
Translation of CN-116023716-A (Year: 2023).*
Rangaraj, Vengatesan M., et al., "Effect of date fruit waste extract as an antioxidant additive on the properties of active gelatin films", Food Chemistry 355 (2021) 129631.
Rangaraj, Vengatesan M., et al., "Silver-sepiolite (Ag-Sep) hybrid reinforced active gelatin/date waste extract (DSWE) blend composite films for food packaging application", Food Chemistry 369 (2022) 130983.

* cited by examiner

*Primary Examiner* — Brent T O'Hern
(74) *Attorney, Agent, or Firm* — Billion & Armitage

(57) ABSTRACT

A pH responsive film for indicating food freshness includes a protein, a polysaccharide, and anthocyanin, wherein the protein and the polysaccharide form a protein/polysaccharide matrix within the film, and wherein the film is sufficient to change color in response to a change in pH of the film. Methods of making and using the film are included in the present disclosure. Food preservation systems utilizing the film are also presented.

6 Claims, 7 Drawing Sheets

200

210 CONTACT A GELATIN SOLUTION AND A CHITOSAN SOLUTION TO FORM A FIRST SOLUTION

220 CONTACT THE FIRST SOLUTION WITH GLYCEROL TO FORM A SECOND SOLUTION

230 CONTACT THE SECOND SOLUTION WITH AN OIL EXTRACT INCLUDING ANTHOCYANIN TO FORM A THIRD SOLUTION

240 DRY THE THIRD SOLUTION SUFFICIENT TO FORM THE FILM

FOOD PACKAGING FILMS FOR FOOD STORAGE AND FRESHNESS MONITORING

BACKGROUND

Food packaging systems are essential for maintaining food quality and safety during storage and transportation. Further, food packaging systems protect against microbial decay. Currently, most food packaging systems include fossil-based food packaging materials. These fossil-based food packaging materials present significant environmental concerns as they are not biodegradable, compostable, or edible. Accordingly, there is great demand for the creation and use of smart food packaging that is both biodegradable and edible. Smart food packaging that is both edible and sufficient for food-quality monitoring is an effective alternative to fossil-based food packaging. Smart food packaging capable of food-quality monitoring may replace synthetic food additives and may ensure that food is safe to consume. Further, smart food packaging providing antioxidant and antimicrobial properties can increase the shelf-life of food.

SUMMARY

According to one aspect, a pH responsive film for indicating food freshness includes a protein, a polysaccharide, and anthocyanin, wherein the protein and the polysaccharide form a protein/polysaccharide matrix within the film, and wherein the film is sufficient to change color in response to a change in pH of the film.

According to another aspect, a method of monitoring food freshness includes providing one or more food items and sealing the one or more food items with a film, wherein the film includes a colorimetric indicator sufficient to indicate freshness of the one or more food items and the film includes a protein, a polysaccharide, glycerol, and anthocyanin.

According to another aspect, a food preservation system includes a film for preserving freshness of a food item, the film including a protein, a polysaccharide, and anthocyanin, wherein the film includes a colorimetric indicator sufficient to indicate freshness of the food item.

BRIEF DESCRIPTION OF THE SEVERAL VIEWS OF THE DRAWINGS

This written disclosure describes illustrative embodiments that are non-limiting and non-exhaustive. Reference is made to illustrative embodiments that are depicted in the figures, in which.

DETAILED DESCRIPTION

Definitions

Figure 1:
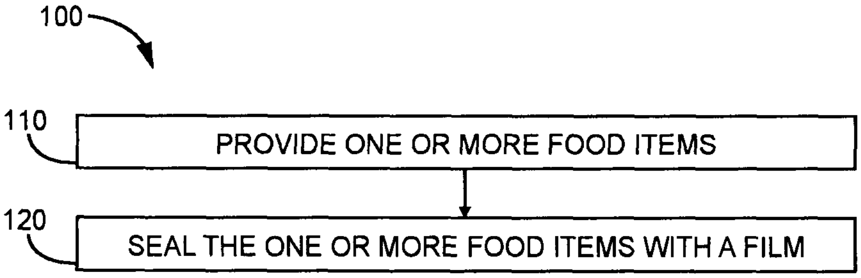
FIG. 1 illustrates a method 100 of monitoring food freshness, according to some embodiments.

As used herein, the term "edible" refers to items that may be safely consumed by humans and animals.

As used herein, the term "extract" refers to a substance or compound removed from another substance or compound. For example, extract may refer to a compound taken from a plant, flower, fruit, and seed. Extract may refer to an oil extract or a botanical-based essential oil.

As used herein, the term "film" may refer to a separating layer of material. For example, a film may be used for separating an item from a fluid. A film may be flexible and may be used to seal a food item. The film may be any portion of food packaging used to seal the food item. The term film may refer to a coating or membrane. A film may be formed through hydrogen bonding and electrostatic interactions.

As used herein, the term "food" refers to any edible substance or compound. Food may refer to a substance consumed by a human or animal for nutritional support. For example, food may refer to meat, poultry, fish, pork, and beef. Food may refer to carbohydrates, grains, fruits, vegetables, protein, dairy, and fat.

As used herein, the term "freshness" refers to the quality of food and/or the safety of the food. For example, fresh food may be food that has not spoiled yet. Freshness may refer to the taste, color, and smell of food. In one example, food harvested more recently is fresher than food harvested less recently.

As used herein, the term "packaging" refers to an enclosure, container, film, and/or surrounding for a food product. For example, packaging may refer to a container for holding/storing a food product and a film for sealing the container. Packaging may refer to a flexible film for substantially sealing a food product from fresh air.

Discussion

Embodiments of the present disclosure describe a novel composition for edible, smart food packaging. Currently, most food packaging systems include fossil-based food packaging. This conventional packaging is not biodegradable, compostable, or edible. The smart food packaging of the present disclosure is capable of real-time food freshness monitoring and can act as an antioxidant and antimicrobial agent. Accordingly, the food packaging can extend the shelf life of food and provide a color indication based on the real-time freshness of food. This color indication is sufficient to inform a consumer regarding the real-time freshness of the food item. Importantly, this smart food packaging may be safe for human consumption, compostable, and biodegradable, providing a beneficial alternative to fossil-based food packaging.

The smart-food packaging of the present disclosure may include a film, such as an edible film. The film may include one or more of proteins, polysaccharides, anthocyanin, carotenoids, essential oil, oil extracts, and glycerol. For example, the film may include all of proteins, polysaccharides, anthocyanin, and glycerol. In one example, the film includes one or more proteins, one or more polysaccharides, and anthocyanin. In another example, the film includes one or more proteins, one or more polysaccharides, anthocyanin, and carotenoids. Anthocyanin and carotenoids may be derived from a plant, an oil extract, or an essential oil composition. Carotenoids may be colored pigments from plants, vegetables, and fruits. Non-limiting examples of carotenoids include carotenes, such as alpha carotene and beta carotene. Importantly, the film may combine antioxidant and antimicrobial activity with sensory properties.

The protein may include gelatin. In one example, gelatin is an edible biopolymer and is a translucent, colorless compound derived from collagen from animals. Gelatin is an edible biopolymer with high biocompatibility, good film-forming capability, and biodegradability. Further, gelatin may include antimicrobial and antioxidant activities. Gelatin may include a protein content of about 75% or greater. Gelatin used to form the film may be in the form of a liquid or a solid, such as a powder. In one example, gelatin may include fish skin gelatin and may or may not be purified. In another example, gelatin may include Type A gelatin or Type B gelatin. In another example, gelatin may include a mixture of type A gelatin and type B gelatin. Type A gelatin may include about 78-80 mmol of free carboxyl groups per 100 g of protein. Type B gelatin may include about 11-115 mmol of free carboxyl groups per 100 g of protein. Gelatin may be used in varying wt. % in the film. An example of the structure of gelatin is detailed below.

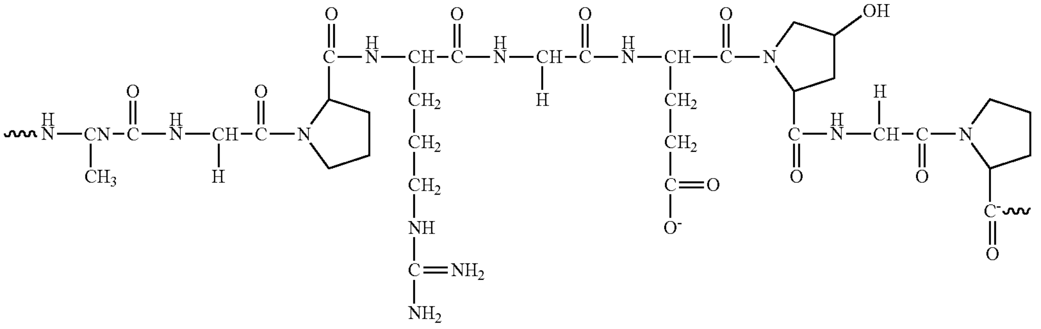

The polysaccharide may include chitosan. In one example, chitosan is an edible biopolymer and is a natural, biodegradable polysaccharide extracted from marine natural sources. In another example, chitosan is a sugar from the outer skeleton of shellfish (such as lobster, crab, and shrimp). For example, chitosan may be derived from crustacean shells by treating the shell with a base, such as sodium hydroxide. Chitosan may be a linear polysaccharide including randomly distributed D-glucosamine and N-acetyl-D-glucosamine. Chitosan may be used in varying wt. % in the film. An example of the structure of chitosan is shown below. The letter 'n' in the structure may represent any number, such as n=1 to 1000.

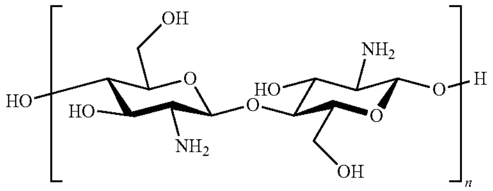

The film may include both a protein and a polysaccharide. In one example, the protein and the polysaccharide form a matrix. In another example, the protein and the polysaccharide are present in the film composition in a weight ratio ranging from 5:95 to 95:5, respectively. In yet another example, the protein and the polysaccharide are present in the film composition in a weight ratio ranging from 30:70 to 70:30, respectively. For example, the protein and the polysaccharide may be present in the film composition in a weight ratio of 30:70, 40:60, 50:50, 60:40, 70:30, or values therebetween. In another example, the protein and the polysaccharide are present in the film composition in a weight ratio ranging from 40:60 to 60:40, respectively. In one non-limiting example, the protein includes gelatin, the polysaccharide includes chitosan, and the weight ratio of gelatin to chitosan is 60:40. In another example, a film including the matrix of the present paragraph has a higher mechanical and water vapor permeability compared to films without a binary matrix. Additionally, the matrix is capable of providing excellent mechanical and water vapor permeability properties without affecting the halochromic color changing properties of the film.

The film may include one or more anthocyanins. Anthocyanins are naturally occurring pigments and antioxidants. In one example, anthocyanins are water soluble pigments found in flowers and plant tissue. For example, anthocyanins may be derived from different botanical sources such as purple onion peel, blackberry, purple potato, roselle, red cabbage, and black chokeberry. Anthocyanins may be present in various fruits, such as berries, and vegetables. For example, anthocyanins may be present in berries, dates, plums, organs, cherries, grapes, pomegranates, onions, cabbage, beans, and eggplant. Anthocyanins may exhibit antioxidant, antimicrobial, and pH-sensitive halochromic properties. Anthocyanins may be present in essential oils and natural extracts such as date seed extract (DSE) and/or date syrup extract. Examples of anthocyanins include cyanidin (1), delphinidin (2), pelargonidin (3), peonidin (4), petunidin (5), and malvidin (6). The corresponding structures of cyanidin (1), delphinidin (2), pelargonidin (3), peonidin (4), petunidin (5), and malvidin (6) are shown below.

(1)

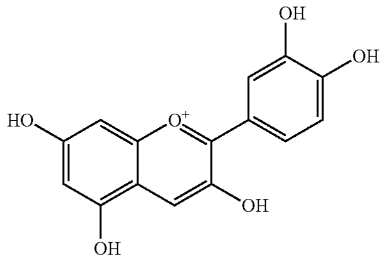

(2)

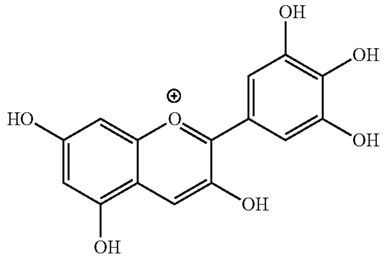

(3)

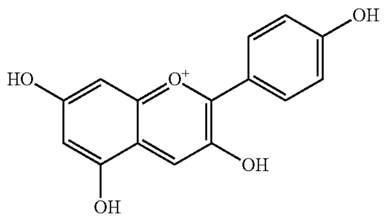

(4)

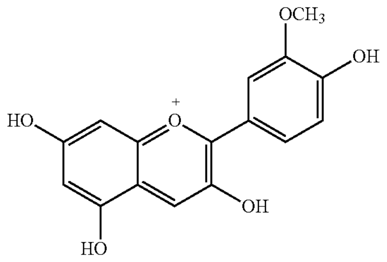

(5)

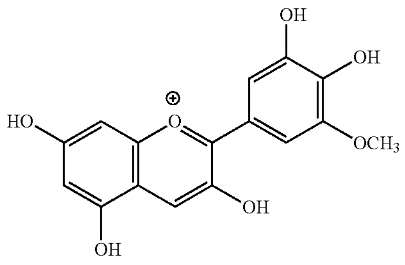

(6)

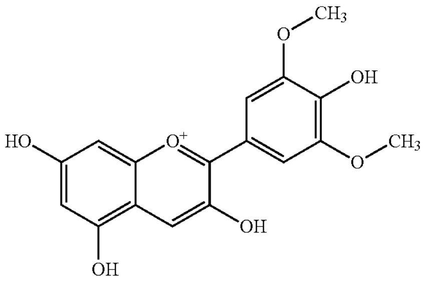

One or more components in the film may be derived from a plant. For example, an oil extract or essential oil composition may be utilized to form the films of the present disclosure. The oil extract and/or essential oil may be used in varying weight percentages when forming the film. The oil extract or essential oil composition may include one or more of anthocyanins and carotenoids. In one example, the oil extract includes oil derived from one or more plants in the Rosaceae family. For example, the oil extract may include oil derived from the *Rubus* genus and/or the Fragaria genus. The *Rubus* genus may include raspberries, blackberries, and dewberries. The Fragaria genus may include strawberries, such as hybrid strawberries. In another example, the oil extract includes oil derived from one or more plants in the Arecaceae family. For example, the oil extract may include oil derived from the *Phoenix* genus. The *Phoenix* genus may include a date palm, which produces a date palm fruit, *Phoenix dactylifera.*

Date fruit production is important for the consumption of date fruit and for producing syrup, sugar, jam, paste, and vinegar. While date fruit production is important for feeding the growing world, this production process creates a large amount of waste. Date seeds have been a conventionally unwanted material. This date seed may include dietary fiber, protein, carbohydrates, phenols, and minerals. Date seeds extracts (DSE) contain tremendous contents of active phytochemical compounds, including carotenoids, sterols, polyphenolics, flavonoids, quinones, and anthocyanins. DSE may be captured by extraction techniques, such as cold extraction and Soxhlet extraction and can be utilized for films of the present disclosure. These DSE may be extracted from the date seeds. DSE may contain anthocyanins, betanin, and curcumin. The total phenolic content (TPC) and total anthocyanin content (TAC) of the DSE may vary depending on the date seed variety, extraction method, solid-to-solvent ratio, temperature, and type of solvent. In one example, the date seed extract includes a total anthocyanin content ranging from 0.1 mg/g to 10 mg/g. In another example, the date seed extract includes a total anthocyanin content ranging from 0.5 mg/g to 4 mg/g. In yet another example, the date seed extract includes a total anthocyanin content ranging from 0.5 mg/g to 2 mg/g.

The film may include DSE, gelatin, and chitosan. In one example, there is no macroscopic phase separation in the film. Therefore, the DSE may be uniformly dispersed with the gelatin/chitosan matrix through hydrogen bonding and electrostatic interactions. The polyphenolic-rich DSE may induce a robust intermolecular interaction (hydrogen bonding and electrostatic interactions). These interactions may result in a strong and dense network structure in the film. Electrostatic interactions may form between the amino and carbonyl groups in the extract, gelatin and chitosan. Accordingly, as an example, a greater DSE content in the film may further limit the water molecule interactions with the gelatin/chitosan matrix. The matrix of gelatin and chitosan may be hydrophilic, as the film network may include these components and glycerol. The DSE-incorporated smart films may show a lower moisture content with an increase in DSE content.

The weight percentage of the gelatin/chitosan matrix in the total film composition may range from about 30% to about 98%. In one example, the weight percentage of the gelatin/chitosan matrix in the total film composition may range from about 40% to about 95%. For example, the weight percentage of the gelatin/chitosan matrix in the total film composition may range from about 50% to about 92%. For example, the weight percentage of the gelatin/chitosan matrix in the total film composition may range from about 55% to about 90%. In another example, the weight percentage of the gelatin/chitosan matrix in the total film composition may range from about 65% to about 85%. For example, the weight percentage of the gelatin/chitosan matrix in the total film composition may be about 65%, about 66%, about 67%, about 68%, about 69%, about 70%, about 71%, about 72%, about 73%, about 74%, about 75%, about 76%, about 77%, about 78%, or values therebetween. For example, the weight percentage of the gelatin/chitosan matrix in the total film composition may be about 79%, about 80%, about 81%, about 82%, about 83%, about 84%, about 85%, or values therebetween. In yet another example, the weight percentage of the gelatin/chitosan matrix in the total film composition may range from about 75% to about 85%.

DSE may be added to the gelatin and chitosan solutions during the formation process. The Soxhlet extraction method may be utilized to prepare DSE. In one example, the weight percentage of DSE in the total film composition ranges from about 1% to about 40%. In another example, the weight percentage of DSE in the total film composition ranges from about 2% to about 35%. In yet another example, the weight percentage of DSE in the total film composition ranges from about 5% to about 25%. For example, the weight percentage of DSE in the total film composition ranges from about 8% to about 20%. For example, the weight percentage of DSE in the total film composition may be about 8%, about 9%, about 10%, about 11%, about 12%, about 13%, about 14%, about 15%, or values therebetween. For example, the weight percentage of DSE in the total film composition may be about 16%, about 17%, about 18%, about 19%, about 20%, or values therebetween. The weight percentage (wt. %) of DSE in the total film composition may be greater than 5%, greater than 10%, greater than 15%, greater than 20%, or greater than 25%.

In one example, the weight percentage of glycerol in the total film composition ranges from about 1% to about 40%. In another example, the weight percentage of glycerol in the total film composition ranges from about 2% to about 20%. In yet another example, the weight percentage of glycerol in the total film composition ranges from about 5% to about 15%. For example, the weight percentage of glycerol in the total film composition may be about 5%, about 6%, about 7%, about 8%, about 9%, about 10%, about 11%, about 12%, about 13%, about 14%, about 15%, or values therebetween. In yet another example, the weight percentage of glycerol in the total film composition is 10%. The total phenolic content (TPC) of the film may be calculated with Equation 1, where C is the concentration of phenolic compounds in terms of gallic acid (mg/mL), V denotes the volume of the film extract solution (mL), and M represents the weight of the film sample (g). The TPC may be expressed in terms of mg of gallic acid equivalent (GAE) per g of the film. In one example, the TPC of the film ranges from 100 mg GAE/g to 300 mg GAE/g. In another example, the TPC of the film ranges from 200 mg GAE/g to 240 mg GAE/g.

$$\text{Total Phenolic Content (mg/g)} = \frac{C \times V}{M} \quad \text{(Equation 1)}$$

The film may include varying thicknesses. In one example, the film may have a thickness ranging from about 0.01 mm to about 1 mm. In another example, the film may have a thickness ranging from about 0.05 mm to about 0.5 mm. In yet another example, the film may have a thickness ranging from about 0.1 mm to about 0.2 mm. In one example, the film includes an extract, and the thickness of the film may increase linearly with an increase in the extract content. This may be attributed to the increase in the solid content of the film. The water content of the film represents the total free volume occupied by hydrated molecules within the film network and may be calculated by Equation 2, where Wi—initial weight of the film and Wf—final weight of the film after drying. The water content of the film may range from about 2% to about 30%. In one example, the water content of the film may range from about 5% to about 25%. In another example, the water content of the film may range from about 12% to about 19%. In one example, the film includes an extract (such as DSE), and the water content may be decreased by an increase of extract in the film. The extract (such as DSE) may induce intermolecular interactions, such as H-bonding and electrostatic interactions.

$$\text{Water Content (\%)} = \frac{(Wi - Wf)}{Wi} \times 100 \quad \text{(Equation 2)}$$

The film may include various water solubility percentages. In one example, the film may have a water solubility percentage ranging from about 10% to about 40%. In another example, the film may have a water solubility percentage ranging from about 15% to about 35%. In yet another example, the film may have a water solubility percentage ranging from about 20% to about 30%. The water vapor permeability of the film may be calculated by Equation 3, where WVTR denotes water vapor transmission rate, L represents mean film thickness (m), and ΔP is the partial water vapor pressure difference (Pa) between two sides of the film. The water vapor permeability (WVP) of the film may range from about $2\times10^{-10} g\cdot s^{-1}\cdot m^{-1}\cdot pa^{-1}$ to about $6\times10-10\ g\cdot s^{-1}\cdot m^{-1}\cdot pa^{-1}$. For example, the water vapor permeability of the film may range from about $3\times10-10\ g\cdot s^{-1}\cdot m^{-1}\cdot pa^{-1}$ to about $5\times10-10\ g\cdot s^{-1}\cdot m^{-1}\cdot pa^{-1}$. In one example, the film includes an extract, and the water vapor permeability of the film increases with an increase in extract content. Higher extract content may reduce segmental motion of the polymer network, favoring water diffusion through the film and resulting in increased water vapor permeability values.

$$WVP = \frac{WVTR \times L}{\Delta P} \quad \text{(Equation 3)}$$

The tensile stress at maximum load for the film may range from about 5 MPa to about 100 MPa. In one example, the tensile stress at maximum load for the film may range from about 15 MPa to about 60 MPa. For example, the tensile stress at maximum load for the film may range from about 30 MPa to about 55 MPa. In another example, the tensile strength of the film increases with the addition of DSE. The increased tensile strength in this example is attributed to electrostatic interactions and hydrogen bonding. In one example, the tensile strain at break ranges from about 3% to about 40%. In another example, the tensile strain at break ranges from about 5% to about 35%. In yet another example, the tensile strain at break ranges from about 7% to about 30%. The flexibility of the film may increase with an increase in DSE content.

The UV-Vis light barrier is an important component of food packaging systems (such as the films of the present disclosure) that extend shelf life by preventing pigment degradation, photooxidation, discoloration, loss of nutrients, and formation of undesirable compounds from lipid oxidation, resulting in extended food shelf life. The film including an incorporation of DSE into the chitosan/gelatin blend matrix may significantly decrease the UV-Vis light transmittance of the film, resulting in a decrease in film transparency. In one example, films with greater than or equal to 5% DSE content may be more suitable for practical applications because these films are colorimetrally visible to the naked eye in a basic pH range. In one example, a film without DSE may exhibit a transmittance of more than 70% in the visible spectrum (400-800 nm), which demonstrates high transparency. In another example, the addition of DSE does not change the transparency, but this addition may greatly improve the UV barrier properties. In yet another example, at 600 nm, the transmittance of a film of the present disclosure may range from about 40% to about 82%. In yet another example, at 700 nm, the transmittance of a film of the present disclosure may range from about 40% to about 82%.

The antioxidant capacity of the film may be quantified by the 2,2-diphenyl-1-picrylhydrazyl (DPPH) radical scavenging efficiency. In one example, the DPPH radical scavenging efficiency ranges from about 40% to about 95%. In another example, the DPPH radical scavenging efficiency ranges from about 45% to about 85%. In yet another example, the DPPH radical scavenging efficiency ranges from about 50% to about 80%. The DPPH radical scavenging efficiency may increase with an increased DSE content in the film. The DPPH radical scavenging efficiency may be calculated using Equation 4, where $A_b$—DPPH ethanolic solution absorbance control value, and $A_s$—DPPH ethanolic solution absorbance value with the film sample. In one example, the DPPH radical scavenging ability is greater for a film including DSE than a DSE-free film due to the antioxidant activity of both chitosan and gelatin. The higher DSE content in the film may include a greater amount of polyphenols, which scavenge the free radical and inhibits the radical formation in the food. Inhibiting radical formation in food may increase the shelf-life of food. For example, increasing the shelf-life of food may include increasing the shelf-life of the food by one or more days.

$$DPPH \text{ radical scavenging efficiency } (\%) = \frac{A_b - A_s}{A_b} \times 100 \quad \text{(Equation 4)}$$

The film may be sufficient for a colorimetric pH response from one or more food items. For example, the film may be sufficient for a colorimetric pH response when the pH of the one or more food items increases by more than 0.1. The film may be sufficient for a colorimetric pH response when the pH of the one or more food items increases or decreases by more than 0.4. In one example, the film may be sufficient for a colorimetric pH response when the pH of the one or more food items changes from a neutral (7) or acidic pH (less than 7) to a basic pHl (greater than 7). For example, the film may change color in response to a pII change from about 6.2 to about 7.2.

The film may be used for storing food items and for food packaging materials. Food may refer to a substance consumed by a human or animal for nutritional support. For example, food may refer to meat, poultry, fish, pork, and beef. In one example, food may refer to shrimp. The film may be used for food storage to monitor shrimp freshness. The film may change color with increasing storage time, indicating an increase in the total volatile basic nitrogen (TVB-N)/volatile ammonia content in the food and/or of the film. The generated TVB-N may transfer to the film, resulting in a color change of the film. In one non-limiting example, the TVB-N of the film after five days of food storage may range from about 20 mg/100 g to about 45 mg/100 g.

In one example, the film may be sufficient for a sensitive, visual, and high contrast response to ammonia vapor even in films with a DSE content of about 5 wt. %. Films of the present disclosure may detect biogenic amines and monitor seafood freshness. In one example, the film may change from a yellow-brown color to a dark brown color with increasing storage time and/or an increase in TVB-N. In another example, the film may change from clear to a yellow, red, or brown color with increasing storage time and/or an increase in TVB-N. In yet another example, the film may change from a substantially clear film to an orange or red color with increasing storage time and/or an increase in TVB-N. The light transmittance may decrease with an increase in storage time. For example, the film may initially be clear and have the greatest light transmittance. Once the food starts to age or become less fresh, the film may change from clear to a color.

The films of the present disclosure may be highly sensitive to ammonia. Variables of color and lightness/darkness of the film may include L*, a*, b*, and ΔE. L* may represent the darkness to brightness on a scale of 0 to 100. The a* value may represent greenness to redness, with values of −128 to +127. The b* value may represent the blueness to yellowness, with values of −128 to +127. The a* value of these films may increase linearly after exposure to $NH_3$, which corresponds to the DSE content in the films and indicates that the film's redness has increased. Similarly, the L* and b* values of these films may decrease after $NH_3$ exposure, indicating that the yellow color of the film diminishes rapidly. In addition, the total color difference ΔE of the films may increase linearly with an increase in the DSE content in the film upon $NH_3$ exposure, indicating that these films have a sensitive, visual, and high contrast response to ammonia vapor even in the film with a low content of DSE (5 wt. %). This result supports the detection of biogenic amines and monitoring food freshness.

Embodiments of the present disclosure include a food preservation system, wherein the food preservation system includes the films of the present disclosure. The food preservation system may be utilized for preserving the freshness of a food item, wherein the film includes a protein, a polysaccharide, and anthocyanin. The food preservation system may include a film having a colorimetric indicator sufficient to indicate freshness of the food item. The food preservation system may indicate the freshness of the food item by changing color in response to a change in pH of the film. The food preservation system may indicate the freshness of the food item by changing color in response to volatile organic amines released by the food item. The food preservation system may further include a container, receptacle, and/or storage device for use in the food preservation system. This container, receptacle, and/or storage device may hold the food item. This container, receptacle, and/or storage device may be utilized in conjunction with the film to seal the food item and block fresh air.

Referring to FIG. 1, a method 100 of monitoring food freshness is illustrated. The method 100 includes the following steps:

STEP 110, PROVIDE ONE OR MORE FOOD ITEMS, includes providing one or more food items such as pork, poultry, seafood, and/or beef. Food items may include any food of the present disclosure. Food may refer to a substance consumed by a human or animal for nutritional support. Food may refer to any substance which may release volatile nitrogen. In one non-limiting example, the one or more food items include shrimp;

STEP 120, SEAL THE ONE OR MORE FOOD ITEMS WITH A FILM, includes sealing the one or more food items, such as seafood, with a film of the present disclosure, wherein the film includes a colorimetric indicator sufficient to indicate freshness of the one or more food items. Sealing may include preventing fresh air from contacting the one or more food items and/or increase the shelf-life of food. Sealing may include surrounding the one or more food items with the film and/or preventing additional moisture from contacting the food. Sealing may include storing the one or more food items. In one example, sealing the one or more food items with a film includes placing the one or more food items into a packaging container and attaching the film to the packaging container. In another example, sealing the one or more food items with a film includes substantially surrounding the one or more food items with the film. Accordingly, the film may act as a standalone food packaging system or may be used in conjunction with a food storage container or other food storage packaging systems.

The film may include one or more of proteins, polysaccharides, anthocyanin, carotenoids, essential oil, oil extracts, and glycerol. For example, the film may include all of proteins, polysaccharides, anthocyanin, and glycerol. In one example, the film includes one or more proteins, one or more polysaccharides, and anthocyanin. In another example, the film includes one or more proteins, one or more polysaccharides, anthocyanin, and carotenoids. Anthocyanin and carotenoids may be derived from a plant, an oil extract, or an essential oil composition. The film may include a gelatin/chitosan matrix and DSE. The DSE may be uniformly dispersed in the gelatin/chitosan matrix through hydrogen bonding and electrostatic interactions. The film may include varying thicknesses. In one example, the film may have a thickness ranging from about 0.01 mm to about 1 mm. In another example, the film may have a thickness ranging from about 0.05 mm to about 0.5 mm. In yet another example, the film may have a thickness ranging from about 0.1 mm to about 0.2 mm.

Monitoring the freshness of the one or more food items may include a color change of the film in response to a change in pH of the film. Monitoring the freshness of the one or more food items may include a color change of the film in response to volatile organic amines released by the one or more food items. Foods such as fish and meats can release volatile organic amines as the food decomposes. For example, the film may be sufficient for a colorimetric pH response when the pH of the one or more food items increases by more than 0.1. The film may be sufficient for a colorimetric pH response when the pH of the one or more food items increases or decreases by more than 0.4. In one example, the film may be sufficient for a colorimetric pH response when the pH of the one or more food items changes from a neutral (7) or acidic pH (less than 7) to a basic pH (greater than 7). For example, the film may change color in response to a pH change from about 6.2 to about 7.2.

Figure 2:
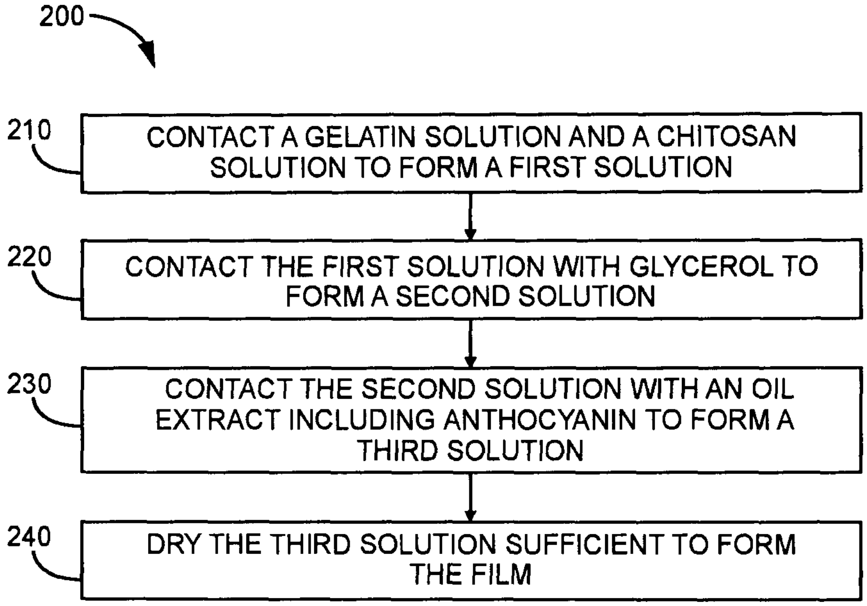
FIG. 2 illustrates a method 200 of making a film, according to some embodiments.

Referring to FIG. 2, a method 200 of making a film is illustrated. The method 200 includes the following steps:

STEP 210, CONTACT A GELATIN SOLUTION AND A CHITOSAN SOLUTION TO FORM A FIRST SOLUTION, includes contacting a gelatin solution, such as a solution of gelatin and water, and a chitosan solution, such as a solution of chitosan and acetic acid to form a first solution. Contacting may include stirring, heating, placing in physical contact or proximity, and/or mixing. The gelatin solution may be formed by dissolving gelatin (such as 2%, w/v) in a solvent such as deionized water. The weight percent of the gelatin in the gelatin solution may range from about 20% to about 90%. In one example, the weight percent of the gelatin in the solution may range from about 40% to about 70%. In another example, the weight percent of the gelatin in the solution may range from about 55% to about 65%. The chitosan solution may be formed by dissolving chitosan (such as 2%, w/v) in a solvent such as 1% glacial acetic acid. The weight percent of the chitosan in the chitosan solution may range from about 10% to about 70%. In one example, the weight percent of the chitosan in the chitosan solution may range from about 20% to about 60%. In another example, the weight percent of the chitosan in the chitosan solution may range from about 35% to about 45%;

STEP 220, CONTACT THE FIRST SOLUTION WITH GLYCEROL TO FORM A SECOND SOLUTION, includes contacting the first solution, including gelatin and chitosan, with glycerol to form a second solution. Contacting may include stirring, heating, placing in physical contact or proximity, and/or mixing. The gelatin and chitosan may be mixed with the glycerol. In one example, the first solution is mixed with glycerol, wherein the weight percentage (weight percentage of glycerol to the total weight of gelatin and chitosan) ranges from about 2% to about 20%. In another example, the first solution is mixed with glycerol, wherein the weight percentage (weight percentage of glycerol to the total weight of gelatin and chitosan) ranges from about 5% to about 15%. In yet another example, the first solution is mixed with glycerol, wherein the weight percentage (weight percentage of glycerol to the total weight of gelatin and chitosan) is 10%.

The second solution may be stirred for any amount of time and may be heated. In one example, the second solution may be stirred for 1 minute to 5 hours and may be heated at/to a temperature ranging from about 25° C. to about 100° C. In another example, the second solution may be stirred for 5 minutes to 2 hours and may be heated at/to a temperature ranging from about 40° C. to about 60° C. In yet another example, the second solution may be stirred for about 50 minutes to about 70 minutes and may be heated at/to a temperature of about 50° C.;

STEP 230, CONTACT THE SECOND SOLUTION WITH ANTHOCYANIN TO FORM A THIRD SOLUTION, includes contacting the second solution with anthocyanin, such as anthocyanin in an oil extract, to form a third solution. Contacting may include stirring, heating, placing in physical contact or proximity, and/or mixing. STEP 230 may be performed simultaneously with STEP 220 or after STEP 220 is completed. For example, anthocyanin or an anthocyanin containing component may be added prior to stirring and heating in STEP 220. The second solution may be contacted with DSE, which includes the anthocyanin and may include betanin and curcumin. Other compounds containing anthocyanins may be utilized, such as essential oils and oil extracts.

DSE contains tremendous contents of active phytochemical compounds, including carotenoids, sterols, polyphenolics, flavonoids, quinones, and anthocyanins. DSE may be captured by extraction techniques, such as cold extraction and Soxhlet extraction and can be utilized for films of the present disclosure. These DSE may be extracted from the date seeds. DSE may contain anthocyanins, betanin, and curcumin. For this purpose, dried seed powder may be mixed with ethanol. In one example, the dried seed powder is mixed with ethanol in a ratio ranging from about 3:1 (v/w) to about 6:1 (v/w). In another example, the dried seed powder is mixed with ethanol in a ratio of 5:1 (v/w). In yet another example, the DSE may be extracted for about 1 hour to about 10 hours. For example, the DSE may be extracted for about 5 hours. Further, ethanolic DSE extract may be vacuum distilled and freeze dried;

STEP 240, DRY THE THIRD SOLUTION SUFFICIENT TO FORM THE FILM, includes drying the third solution, including gelatin, chitosan, and glycerol, sufficient to form the film. Prior to drying, the third solution may be degassed for any amount of time. For example, the third solution may be degassed for about 1 minute to about 10 minutes. In one example, degassing includes removing dissolved gases from liquids. Degassing may include removing air from the third solution. In another example, the third solution may be cast over plates, such as Teflon plates.

The third solution/film may be dried for 1 hour to 100 hours. In one example, the third solution/film may be dried for 10 hours to 80 hours. In another example, the third solution/film may be dried for 65 hours to 75 hours. The third solution/film may be dried at temperatures below room temperature, room temperature (about 20° C.), or above room temperature. In one example, the third solution/film is dried at a temperature ranging from about 10° C. to 40° C. In another example, the third solution/film is dried at a temperature ranging from about 15° C. to 30° C. In yet another example, the third solution/film is dried at a temperature ranging from about 18° C. to 25° C. Dried films may be stored in a desiccator containing a salt such as magnesium salt for future use.

In one example, gelatin and chitosan form a matrix. In another example, gelatin and chitosan are present in the film composition in a weight ratio ranging from 5:95 to 95:5, respectively. In yet another example, gelatin and chitosan are present in the film composition in a weight ratio ranging from 30:70 to 70:30, respectively. For example, gelatin and chitosan may be present in the film composition in a weight ratio of 30:70, 40:60, 50:50, 60:40, 70:30, or values therebetween. The weight percentage of the gelatin/chitosan matrix in the total film composition may range from about 40% to about 95%. In one example, the weight percentage of the gelatin/chitosan matrix in the total film composition may range from about 50% to about 90%. In another example, the weight percentage of the gelatin/chitosan matrix in the total film composition may range from about 65% to about 85%.

In one example, the weight percentage of DSE in the total film composition ranges from about 1% to about 40%. In another example, the weight percentage of DSE in the total film composition ranges from about 2% to about 35%. In yet another example, the weight percentage of DSE in the total film composition ranges from about 5% to about 25%. In one example, the weight percentage of glycerol in the total film composition ranges from about 2% to about 20%. In another example, the weight percentage of glycerol in the total film composition ranges from about 5% to about 15%. In yet another example, the weight percentage of glycerol in the total film composition is 10%.

Importantly, the films of the present disclosure are edible, biodegradable, and are sufficient for food freshness monitoring. Further, the films exhibit antioxidant activity and may be utilized for various types of foods. By monitoring the freshness of food, the films are able to indicate the real-time freshness of the food item to the consumer. For example, the film is capable of changing color in response to a change in pH. The pH may change as the food releases volatile compounds and as the food ages. Therefore, the as-developed films can be utilized for food storage and food quality assurance applications.

Example 1

The Soxhlet extraction method was adapted to prepare date seed extract (DSE). For this purpose, the dried seed powder was mixed with ethanol in a ratio of 5:1 (v/w) and extracted continuously for 5 hours. The ethanolic DSE extract was vacuum distilled, freeze-dried at −20° C. for about 12 hours, and then stored in an airtight container at 5° C. Unlike synthetic polymers and chemosynthetic sensitive dyes (such as methyl red, xylenol blue, bromophenol blue, and bromocresol green), edible biopolymers (chitosan and gelatin) and natural DSE were chosen for their low toxicity and recyclability.

The film-forming solution for a given film composition was prepared by dissolving gelatin (60 wt %) (2%, w/v) in DI water and chitosan (40 wt %) (2%, w/v) in 1% glacial acetic acid separately. Then, the gelatin and chitosan solution was mixed with 10 wt % of glycerol (total gelatin and chitosan weight) and the calculated quantity of DSE (Table 1) and continued to stir for 60 min at 50° C. The solution was then degassed for 5 min and cast over Teflon plates (105 mm×140 mm), followed by drying at room temperature for 72 h. The dried active films were stored at 25° C. in the desiccator containing a saturated solution of Mg $(NO_3)_2 \cdot 6H_2O$ at a relative humidity (RH) of 54% until being used further. Active films with DSE concentrations of 5, 10, 15, 20, and 25 wt % (concerning total gelatin and chitosan weight) were prepared using the described method. The film without DSE inclusion was prepared as a control.

TABLE 1

Gelatin-chitosan/DSE based smart film composition

| Samples | Gelatin/chitosan (60:40) (total wt %) | DSE (wt %) | Glycerol (wt %) |
|---|---|---|---|
| CG (control) | 90 | 0 | 10 |
| CGD1 | 85 | 5 | 10 |
| CGD2 | 80 | 10 | 10 |
| CGD3 | 75 | 15 | 10 |
| CGD4 | 70 | 20 | 10 |
| CGD5 | 65 | 25 | 10 |

The total phenolic content (TPC) was determined by the Folin-Ciocalteu method. An aliquot of extract was added to freshly diluted reagent. After 5 minutes, $Na_2CO_3$ was added followed by incubation at room temperature. The absorbance was measured and gallic acid was used as a calibration standard. The total anthocyanin content (TAC) was assessed by the pH-differential method based on the absorbance measurements of diluted extracts with buffer solutions. Extracts were diluted with buffers until the absorbance was with a linear range. The absorbance of each solution was measured. The total phenolic (TPC) and anthocyanin (TAC) contents of the DSE can vary depending on the date seed variety, extraction method, solid-to-solvent ratio, temperature, solvents, etc. The "Khalas" date seed variety was utilized to derive the active extract for developing smart edible biofilms. The TPC was 215.4 mg eq. GAE/g and the TAC was found to be 0.83 mg CGE/g extract.

Figure 3:
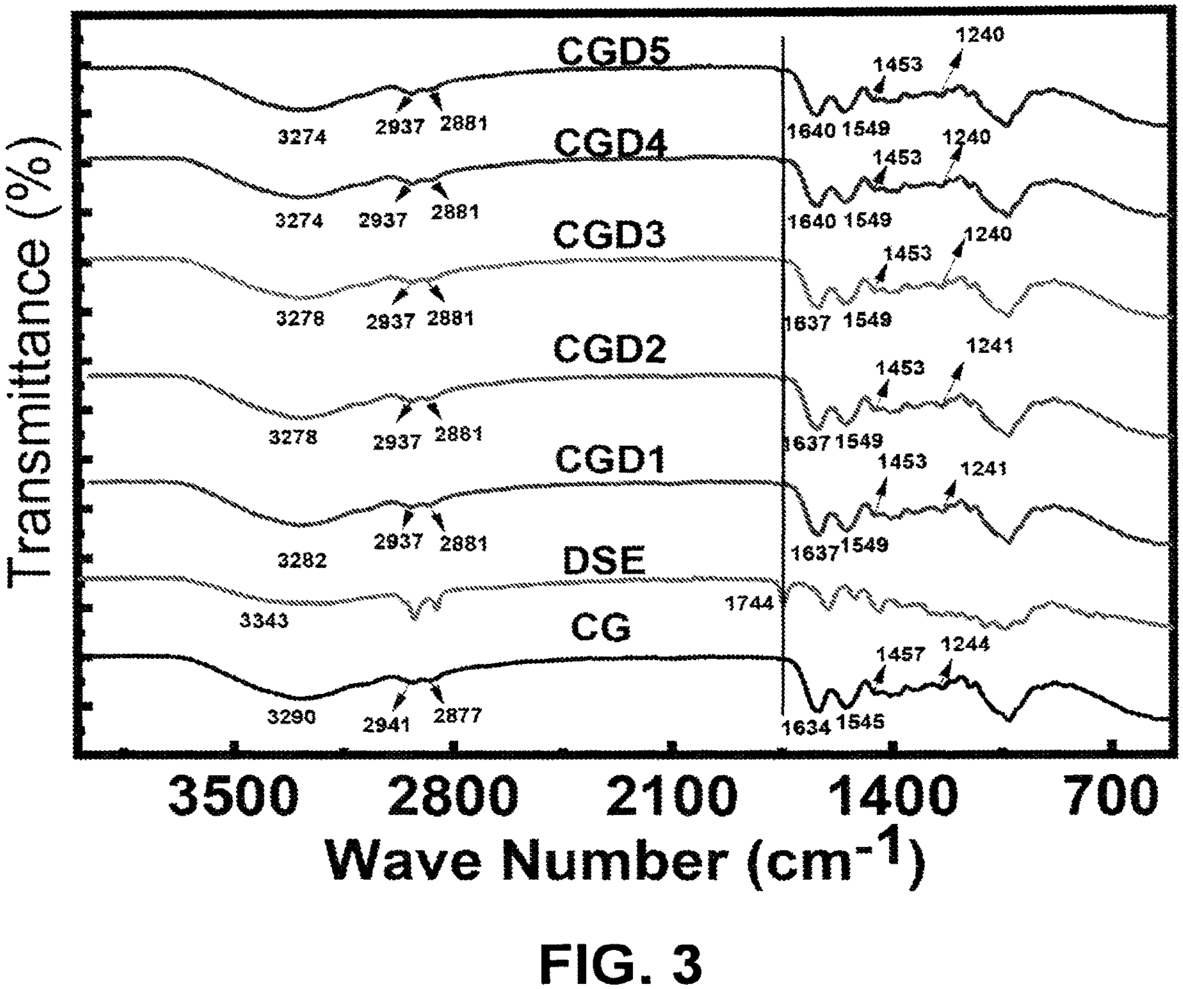
FIG. 3 illustrates an FT-IR spectra of CG (control), DSE (date seed extract), and CGD (chitosan/gelatin/DSE) films, according to some embodiments.

FIG. 3 illustrates an FT-IR spectra of CG (control), DSE, and CGD films, according to some embodiments. Fourier transform infrared spectroscopy was used to evaluate structural changes in the smart film with the addition of DSE. For the pure gelatin/chitosan film (CG), it exhibits the characteristic amide A, B, I, II and III at 3290, 2941/2877, 1634, 1545 and 1244 $cm^{-1}$, respectively. DSE exhibits a broad absorption band at 3336 $cm^{-1}$ (O—H vibration of typical phenolic compounds), and the appearance of peaks at 2970 $cm^{-1}$ and 2932 $cm^{-1}$ (symmetric and asymmetric C—H stretching frequency of alkyl groups the $CH_2$), 1700 $cm^{-1}$ (C═O stretching frequency of the carbonyl group), 1617 $cm^{-1}$, 1496 $cm^{-1}$, and 1450 $cm^{-1}$ (C═C stretching frequency of the aromatic rings in DSE), due to the presence of polyphenolic compounds. Further, with the addition of DSE onto the CG blend matrix, the amide-A band of CG was slightly broadened and shifted from 3290 to 3274 $cm^{-1}$, indicating the formation of hydrogen bonding between the hydroxyl groups of polyphenols in the DSE and the amino/hydroxyl groups in chitosan/gelatin. Above 15 wt. % of DSE content in the film, a new peak raised at 1744 $cm^{-1}$ in CGD films, attributed to the carbonyl stretching absorptions of DSE in the composite films. Besides, the amide II and amide III bands of CGD films shifted to 1549 from 1544 $cm^{-1}$ (CG) and 1241 from 1244 $cm^{-1}$, respectively, due to the electrostatic interactions formed between the amino and carbonyl groups in the extract, chitosan and gelatin.

Figure 4A:
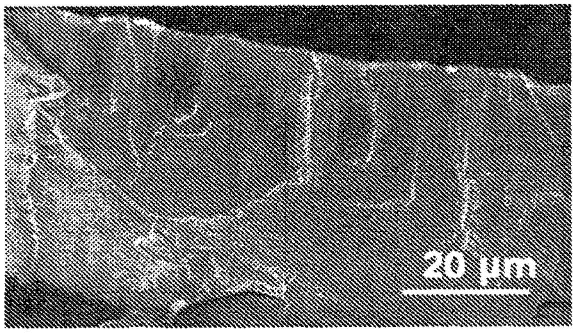
FIG. 4A illustrates a cross-section SEM image of CG (chitosan/gelatin), according to some embodiments.
Figure 4B:
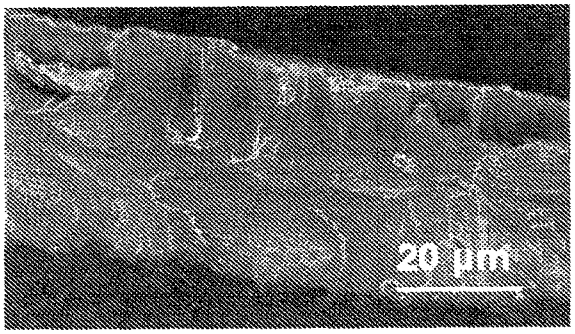
FIG. 4B illustrates a cross-section SEM image of CGD1 (chitosan/gelatin/DSE), according to some embodiments.
Figure 4C:
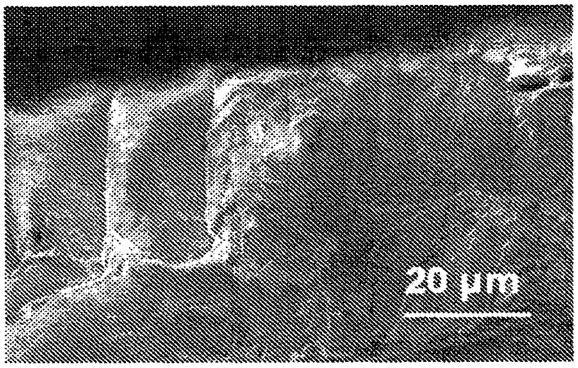
FIG. 4C illustrates a cross-section SEM image of CGD3 (chitosan/gelatin/DSE), according to some embodiments.
Figure 4D:
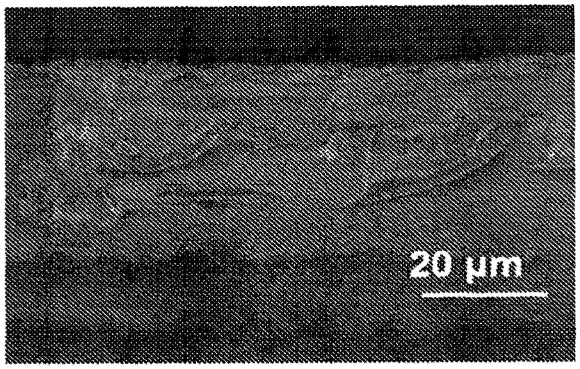
FIG. 4D illustrates a cross-section SEM image of CGD5 (chitosan/gelatin/DSE), according to some embodiments.

FIG. 4A illustrates a cross-section SEM image of CG, according to some embodiments. FIG. 4B illustrates a cross-section SEM image of CGD1, according to some embodiments. FIG. 4C illustrates a cross-section SEM image of CGD3, according to some embodiments. FIG. 4D illustrates a cross-section SEM image of CGD5, according to some embodiments. As can be seen in the SEM images, the roughness of the films increased with an increase in the DSE concentration in the film; however, there was no macroscopic phase separation in the smart films. This indicates that the DSE was uniformly dispersed with the gelatin/chitosan blend matrix through hydrogen bonding and electrostatic interactions.

The thickness of the CG and DSE incorporated CG active films (CDD1-5) are summarized in Table 2. The thickness of the film increases linearly with an increase in DSE content in the gelatin/chitosan blend matrix, mainly due to the increase in the solid content (DSE) of the smart active film. The moisture content of the film represents the total free volume occupied by hydrated molecules within the film network. The pure CG film showed the highest moisture content (17.5%) due to the hydrophilic components of fish gelatin, chitosan, and glycerol in the film network. However, the DSE-incorporated CG active films showed a lower moisture content with an increase in DSE content, indicating that the polyphenolic-rich DSE induces a robust intermolecular interaction (H-bonding and electrostatic interaction). As a result, the higher DSE content in the active film limited the water molecule interactions with the CG blend matrix. The WVP of the CGD films decreased with an increase in the DSE content in the CG blend matrix up to 15 wt. %. The incorporation of DSE might create a torturous pathway in the blend network structure, hindering the permeability of the water molecule through the film. However, the higher DSE content may reduce the segmental motion of the polymer network and the rigidity, favoring the water diffusion through the film and resulting in increased water vapor permeability values.

TABLE 2

Thickness, Moisture Content (MC), Water Solubility (WS), and Water Vapor Permeability (WVP) of the films.

| Samples | Thickness (μm) | Water content (%) | Solubility (%) | WVP ($\times 10^{-10}$g · $s^{-1}$ · $m^{-1}$ · $pa^{-1}$) |
|---|---|---|---|---|
| CG | 110(±2.5)a | 17.5(±0.73)$^a$ | 20.6(±1.0)a | 3.747(±0.03)$^b$ |
| CGD1 | 127(±1.8)$^b$ | 17.7(±0.70)$^a$ | 24.3(±0.9)b | 3.684(±0.03)$^b$ |
| CGD2 | 127(±1.6)$^b$ | 16.1(±0.66)$^b$ | 26.5(±1.1)c | 3.269(±0.02)$^a$ |
| CGD3 | 145(±2.2)$^c$ | 15.2(±0.71)$^c$ | 28.6(±1.3)$^d$ | 3.133(±0.02)$^a$ |
| CGD4 | 145(±2.0)$^c$ | 15.2(±0.65)$^c$ | 28.3(±1.2)$^d$ | 3.913(±0.03)$^c$ |
| CGD5 | 182(±2.1)$^d$ | 14.9(±0.68)$^d$ | 28.7(±1.0)$^d$ | 4.708(±0.04)$^d$ |

Mechanical properties, such as tensile strength and elongation at the break (EB) of the CG and CGD films, are presented in Table 3. Compared to CG film, the tensile strength of the CGD films increased up to the film containing 15 wt % of DSE. The higher tensile strength of these films was attributed to the strong interaction between the DSE and the gelatin/chitosan matrix through electrostatic interactions and hydrogen bonding, showing a strong and dense network structure in the films. However, above 15 wt % DSE in the films showed a decrease in tensile strength due to the higher DSE content acting as a plasticizing effect in the film. Besides, the EB of these films decreased with an increase in DSE content up to 15 wt % due to a strong crosslinked network between the DSE and biopolymer matrices; however, the higher DSE content increased the EB of the films. The high amount of DSE reduces the segmental motion of the intermolecular forces between the polymer matrices and improves the free volume of the blend matrices, thus, the flexibility of the films was improved.

TABLE 3

Mechanical Properties of CG and CGD films.

| Samples | Tensile stress at maximum load (MPa) | Tensile strain at break (%) |
|---|---|---|
| CG | 19.5(±2.6)$^a$ | 28.9(±2.3)$^f$ |
| CGD1 | 42.53(±2.5)$^c$ | 17.8(±1.9)$^b$ |
| CGD2 | 43.42(±2.7)$^d$ | 18.3(±2.2)$^c$ |
| CGD3 | 51.42(±3.2)$^e$ | 7.2(±1.3)$^a$ |
| CGD4 | 42.52(±2.8)$^c$ | 19.3(±2.1)$^d$ |
| CGD5 | 32.02(±1.7)$^b$ | 25.3(±2.7)$^e$ |

Light transmittance and opacity values are presented in Table 4 for example films of the present disclosure. All films have near zero transmittance at 200 nm (UV-C). In the UV ranges of 280 (UV-B) and 300 (UV-A) nm, the DSE-based smart films show a transmittance of less than 5% of the blend-only film, indicating that the unsaturated bonds in the polyphenolic DSE extract significantly affect the UV absorption property. As a result, in terms of the DSE content in the films, the smart DSE films exhibit significant UV resistance in the UV range. The pure blend film exhibits a transmittance of more than 70% in the visible spectrum (400-800 nm), which demonstrates the high transparency of the chitosan/gelatin blend film. When DSE is incorporated into the blend matrix, both the transparency and transmittance of the film may be somewhat reduced due to the weight of DSE. Therefore, the transparency of the DSE film remains unchanged despite the greatly improved UV barrier property.

The film opacity was calculated using Equation 5 and the film's absorbance value at 600 nm. In Equation 5, A is the film's absorbance at 600 nm and X is the film thickness in mm. The results are expressed as A $mm^{-1}$. The opacity value of the films ranged from 0.54 to 1.95, and the pure blend film had a lower opacity value of 0.54, indicating its high transparency. The opacity value of the DSE-based smart films increased with increasing DSE concentration ($p<0.05$). All films had opacity values lower than or very close to conventional packaging, although the opacity values of the DSE-based smart films increased.

$$\text{Opacity} = \frac{A}{X} \quad \text{(Equation 5)}$$

TABLE 4

Light transmittance and opacity values of DSE films.

| | Transmittance (%) | | | | |
|---|---|---|---|---|---|
| Samples | 200 nm | 280 nm | 300 nm | 400 nm | 500 nm |
| CG | $0.03^a$ | $10.9(\pm0.11)^a$ | $23.5(\pm0.23)^a$ | $70.6(\pm0.17)^a$ | $85.5(\pm0.23)^a$ |
| CGD1 | $0.00^b$ | $0.47(\pm0.03)^b$ | $2.98(\pm0.15)^b$ | $50.5(0.19)^b$ | $69.8(\pm0.21)^b$ |
| CGD2 | $0.00^b$ | $0.34(\pm0.02)^c$ | $3.32(\pm0.185)^c$ | $47.2(\pm0.13)^c$ | $66.7(\pm0.17)^c$ |
| CGD3 | $0.00^b$ | $0.19(\pm0.02)^d$ | $1.57(\pm0.12)^d$ | $30.6(\pm0.22)^d$ | $52.2(\pm0.21)^d$ |
| CGD4 | $0.00^b$ | $0.18(\pm0.02)^d$ | $0.55(\pm0.12)^e$ | $26.3(\pm0.17)^e$ | $50.4(\pm0.21)^e$ |
| CGDS | $0.00^b$ | $0.17(\pm0.02)^d$ | $0.13(\pm0.03)^f$ | $7.53(\pm0.11)^f$ | $25.85(\pm0.14)^f$ |

| | Transmittance (%) | | | Opacity |
|---|---|---|---|---|
| Samples | 600 nm | 700 nm | 800 nm | ($A_{600\ nm}$/mm) |
| CG | $87.05(\pm0.19)^a$ | $87.6(\pm0.17)^a$ | $88.1(\leq0.29)^a$ | $0.54(\pm0.11)^a$ |
| CGD1 | $81.1(\pm0.18)^b$ | $81.7(\pm0.14)^b$ | $82.3(\pm0.26)^b$ | $0.72(\pm0.08)^b$ |
| CGD2 | $79.04(\pm0.15)^c$ | $79.5(\pm0.21)^c$ | $80.1(\pm0.17)^c$ | $0.81(\pm0.06)^c$ |
| CGD3 | $72.05(\pm0.11)^d$ | $72.68(\pm0.26)^d$ | $73.1(\pm0.16)^d$ | $0.98(\pm0.07)^d$ |
| CGD4 | $65.01(\pm0.19)^e$ | $65.52(\pm0.16)^e$ | $66.3(\pm0.19)^e$ | $1.29(\pm0.11)^e$ |
| CGDS | $44.06(\pm0.14)^f$ | $44.50(\pm0.15)^f$ | $45.02(\pm0.16)^e$ | $1.95(\pm0.12)^f$ |

Figure 5:
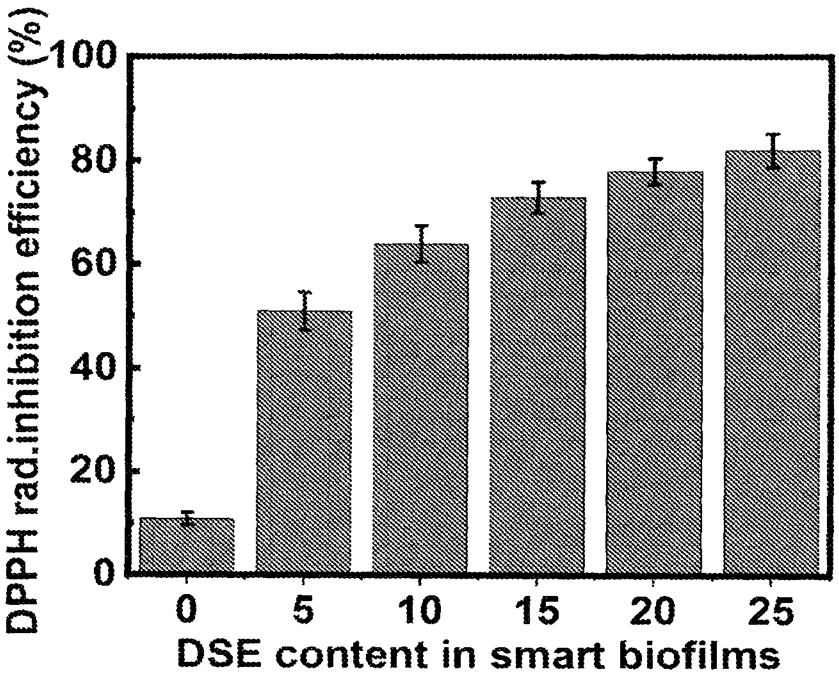
FIG. 5 illustrates antioxidant efficiency of DSE-based gelatin/chitosan smart films, according to some embodiments.

FIG. 5 illustrates antioxidant efficiency of DSE-based gelatin/chitosan smart films, according to some embodiments. The antioxidant capacity of the smart film was evaluated by measuring its DPPH radical scavenging activity/efficiency (RSA). CG films exhibit a lower DPPH scavenging ability (10.8%) due to the antioxidant activity of both chitosan and gelatin. Furthermore, the RSA of the smart films linearly increased with an increase in DSE content in the CG film. The CDD5 film exhibits the highest DPPH RSA of 82%, which is 8.7 times higher than CG control film. The higher DSE content in the film consists of a higher amount of polyphenols, which scavenges the free radical and inhibits radical formation in the food simulant.

Figure 6:
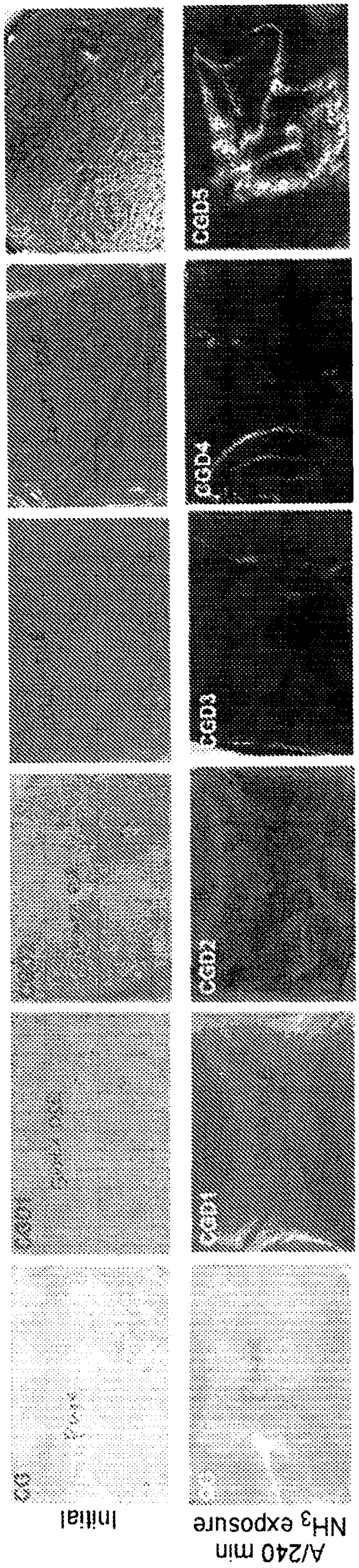
FIG. 6 illustrates the $NH_3$ response of DSE-based smart gelatin/chitosan films, according to some embodiments.

FIG. 6 illustrates the $NH_3$ response of DSE-based smart gelatin/chitosan films, according to some embodiments. The volatile ammonia response of the smart films was measured by exposing these films to a 0.8 M ammonia solution for 240 min at 25° C. These films show remarkable color changes from yellowish-brown to dark-reddish brown within this period, indicating that these smart films are highly sensitive to ammonia. In addition, the color parameters of these films are presented in Table 5 and Table 6. The films were stored in an incubator at 25° C. and 54% relative humidity. As shown, the a* value of these films increased linearly after exposure to ammonia, which corresponds to the DSE content in the films and indicates that the film's redness increased. Similarly, the L* and b* values of these films decreased after $NH_3$ exposure, indicating that the yellow color of the film diminished rapidly. In addition, the total color difference ΔE of these films increased linearly with an increase in the DSE content in the film upon $NH_3$ exposure, indicating that these films have a sensitive, visual, and high contrast response to ammonia vapor even in the smart film with a low content of DSE (5 wt. %). This result supports the subsequent detection of biogenic amines and monitoring seafood freshness.

Figure 7:
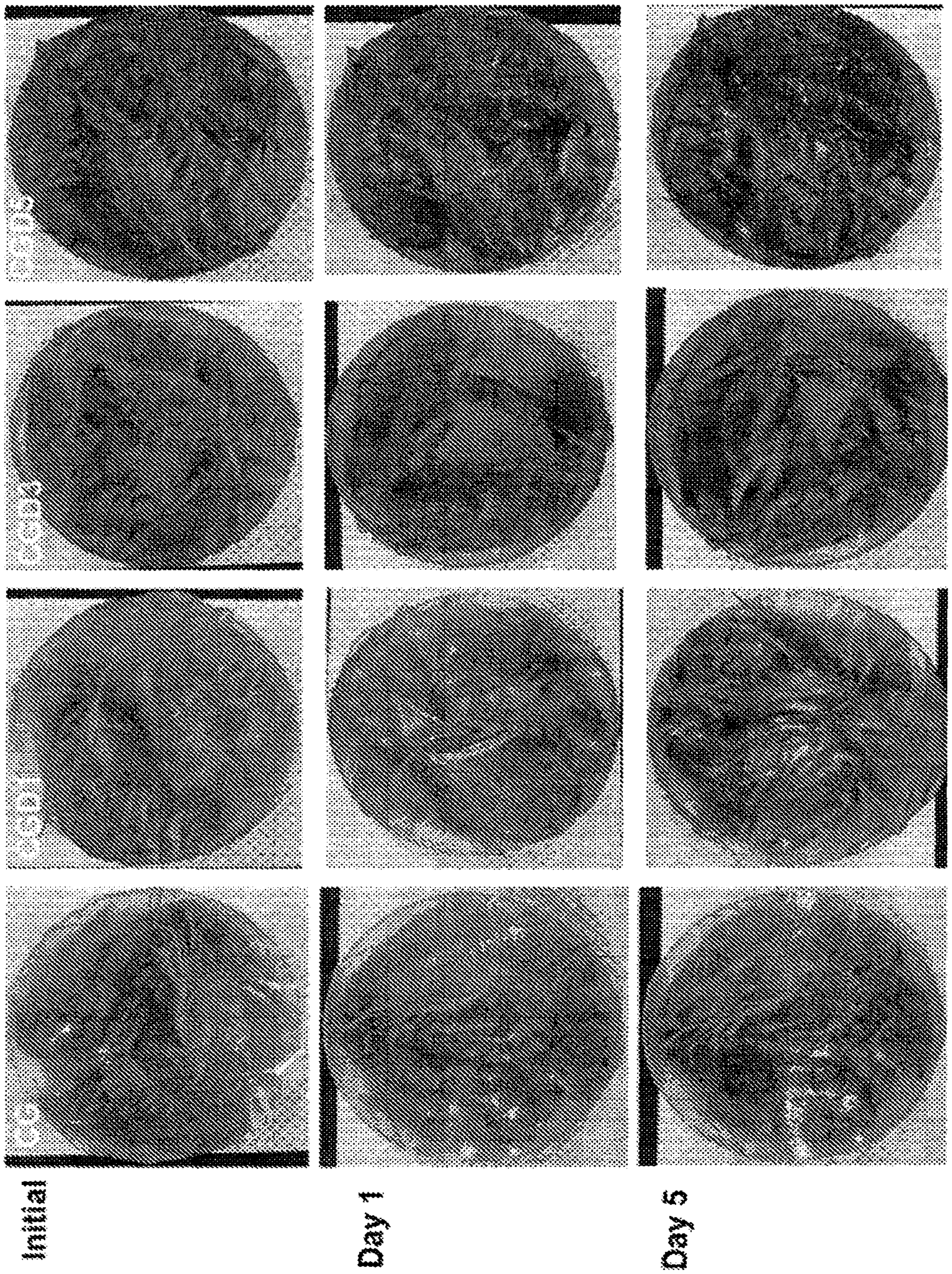
FIG. 7 illustrates real-time freshness monitoring of shrimp using CG, CGD1, CGD3, and CGD5 films, according to some embodiments.

FIG. 7 illustrates real-time freshness monitoring of shrimp using CG, CGD1, CGD3, and CGD5 films, according to some embodiments. Shrimp can be used as a model food to verify the colorimetric pII response of as-developed DSE-based smart films for real-time freshness monitoring of seafood. Shrimps were placed in a Petri dish, and the films were wrapped around the outside and stored at 22° C. to survey the film's detection and preservation capacity. As expected, after five-days of storage, the color of CG films did not change significantly. Indeed, the color of the DSE-incorporated CG films (CGD1, CGD3, and CGD5) changed from yellowish brown to dark brown on the fifth day of storage. The redness value (a* value) was significantly improved, while the brightness (L* value) and yellowness (b* value) of the films decreased with respect to the DSE content in the CG film. Additionally, the pH of the shrimp increased from 6.2 to 7.2, indicating shrimp spoilage after 5 days of storage (Table 5 and Table 6). This generated TVB-N inside the CG-based smart films, resulting in the color of the changes in smart films. The sensitivity and effectiveness of the smart films could vary depending on the accumulation of TVB-N inside the smart edible films and the nature of the foods.

TABLE 5

Color parameters (L, a*, b*, and ΔE) for $NH_3$ response and shrimp storage with TVB-N levels of DSE-based smart films.

| Variable | Conditions | CG | CGD1 | CGD2 |
|---|---|---|---|---|
| L* | Initial | 89.89(±1.72)[a] | 79.56(±1.05)[a] | 73.00(±1.3)[a] |
| | A/$NH_3$ in 240 min | 88.27(±1.15)[b] | 65.83(±1.32)[c] | 52.49(±0.85)[c] |
| | A/5 days Shrimp storage | 87.61(±0.51)[c] | 74.24(±1.05)[b] | 64.36(±0.88)[b] |
| a* | Initial | −0.12(±0.03)[a] | 4.93(±0.33)[a] | 7.77(±0.28)[a] |
| | A/$NH_3$ in 240 min | 0.07(±0.02)[c] | 12.22(±1.27)[c] | 15.49(±1.41)[c] |
| | A/5 days Shrimp storage | −0.07(±0.02)[b] | 7.94(±1.07)[b] | 12.90(±1.57)[b] |
| b* | Initial | −1.33(±0.09)[a] | 16.76(±1.37)[a] | 20.68(±1.51)[a] |
| | A/$NH_3$ in 240 min | −1.21(±0.07)[b] | 7.57(±1.06)[c] | 12.58(±1.41)[c] |
| | A/5 days Shrimp storage | −1.16(±0.05)[c] | 10.67(±1.33)[b] | 16.48(±1.27)[b] |
| ΔE | Initial | — | — | — |
| | A/$NH_3$ in 240 min | 1.63(±0.05)[a] | 18.05(±1.35)[a] | 23.36(±1.28)[a] |
| | A/5 days Shrimp storage | 2.28(±0.07)[b] | 8.62(±1.06)[b] | 10.9(±1.22)[b] |
| TVB-N (mg/100 g) | A/5 days Shrimp storage | 40.82(±1.83) | 37.32(±1.75) | |

TABLE 6

Color parameters (L, a*, b*, and ΔE) for $NH_3$ response and shrimp storage with TVB-N levels of DSE-based smart films.

| Variable | Conditions | CGD3 | CGD4 | CGD5 |
|---|---|---|---|---|
| L* | Initial | 63.43(±0.71)[a] | 58.07(±1.83)[a] | 55.45(±1.72)[a] |
| | A/$NH_3$ in 240 min | 40.73(±1.17)[c] | 31.64(±1.28)[c] | 28.03(±0.76)[c] |
| | A/5 days Shrimp storage | 52.37(±1.24)[b] | 44.94(±0.69)[b] | 39.07(±0.93)[b] |
| a* | Initial | 13.58(±1.03)[a] | 18.33(±1.21)[a] | 20.47(±1.7)[a] |
| | A/$NH_3$ in 240 min | 19.11(±1.53)[c] | 23.48(±1.37)[c] | 27.70(±1.28)[c] |
| | A/5 days Shrimp storage | 17.05(±1.7)[b] | 20.15(±1.41)[b] | 24.88(±1.33)[b] |
| b* | Initial | 28.29(±1.45)[a] | 34.43(±1.56)[a] | 37.76(±1.33)[a] |
| | A/$NH_3$ in 240 min | 20.63(±1.51)[c] | 25.59(±1.67)[c] | 28.68(±1.71)[c] |
| | A/5 days Shrimp storage | 24.03(±1.53)[b] | 28.52(±1.57)[b] | 30.51(±1.6)[b] |
| ΔE | Initial | — | — | — |
| | A/$NH_3$ in 240 min | 25.51(±1.65)[a] | 28.3(±1.91)[a] | 30.44(±1.77)[a] |
| | A/5 days Shrimp storage | 12.35(±1.05)[b] | 16.64(±1.17)[b] | 18.44(±1.32)[b] |
| TVB-N (mg/100 g) | A/5 days Shrimp storage | 35.25(±1.39) | | 32.28(±1.55) |

The values are displayed in "mean±standard deviation" format. The difference in alphabet notation in a given column indicates a significant change ($p<0.05$) in the measured property as calculated using Tukey's test method.

Importantly, the incorporation of DSE into the chitosan/gelatin blend matrix significantly decreased the UV-Vis light transmittance of the films, resulting in a decrease in film transparency. In addition, smart edible films showed an improved water vapor permeability up to 15 wt % of DSE content. In addition, the tensile strength of the smart films increased up to a DSE content of 15 wt % and the film's flexibility increased with an increase in DSE content. The film exhibited the highest antioxidant activity of 82% in a fatty simulant medium. The as-developed smart films are pH-sensitive, and the color changed from yellowish brown to dark brown in ammonia vapor at 54% RH. The film's color changed from yellowish brown to dark reddish brown with increasing storage time, indicating an increase in total volatile basic nitrogen (TVB-N) content in the shrimp sample. The films with >5% DSE content were more colorimetrically visible to the naked eye in a basic pH range.

While the disclosure has been described with reference to an exemplary embodiment(s), it will be understood by those skilled in the art that various changes may be made, and equivalents may be substituted for elements thereof without departing from the scope of the embodiment(s). In addition, many modifications may be made to adapt a particular situation or material to the teachings of the embodiment(s) without departing from the essential scope thereof. Therefore, it is intended that the disclosure is not limited to the disclosed embodiment(s), but that the disclosure will include all embodiments falling within the scope of the appended claims. Various examples have been described. These and other examples are within the scope of the following claims.

What is claimed is:

1. A food preservation system, the food preservation system comprising:

a film for preserving freshness of a food item, the film including a protein, a polysaccharide, and a date seed extract including anthocyanin, wherein a weight percentage of the date seed extract in the film ranges from about 1 wt. % to about 40 wt. %, and wherein the film provides a colorimetric indication sufficient to indicate freshness of the food item.

2. The food preservation system of claim 1, wherein the protein includes gelatin.

3. The food preservation system of claim 1, wherein the polysaccharide includes chitosan.

4. The food preservation system of claim 1, wherein the date seed extract includes a total anthocyanin content (TAC) ranging from 0.5 mg/g to 4 mg/g.

5. The food preservation system of claim 1, wherein the indicating freshness of the food item includes a color change of the film in response to a change in pH of the film.

6. The food preservation system of claim 1, wherein the indicating freshness of the food item includes a color change of the film in response to volatile organic amines released by the food item.

* * * * *